United States Patent [19]

Sammons

[11] Patent Number: 4,635,894
[45] Date of Patent: Jan. 13, 1987

[54] MULTI-PURPOSE FURNITURE SWIVEL ASSEMBLY

[75] Inventor: Gregg J. Sammons, Edina, Minn.

[73] Assignee: Fournier Accessory Furniture, Inc., Minneapolis, Minn.

[21] Appl. No.: 745,195

[22] Filed: Jun. 17, 1985

[51] Int. Cl.[4] ............................................. F16M 13/00
[52] U.S. Cl. ....................................... 248/558; 108/103; 108/139; 248/349; 248/645; 248/664; 384/615; 384/617
[58] Field of Search ............... 248/349, 1 H, 558, 666, 248/667, 425, 664, 645, 131, 186; 108/139, 62, 21, 103, 104, 20, 13; 312/305, 252, 266; 384/615, 617

[56] References Cited

U.S. PATENT DOCUMENTS

| 288,408 | 11/1883 | Chew | 248/131 X |
|---|---|---|---|
| 1,623,575 | 4/1927 | Campbell | 248/349 X |
| 1,859,352 | 5/1932 | Albee | 248/131 X |
| 2,193,384 | 3/1940 | Vunovich | 108/139 |
| 2,808,223 | 10/1957 | Abeles et al. | 108/139 X |
| 2,935,288 | 5/1960 | Summerer | 312/252 X |
| 3,170,741 | 2/1965 | Richards, Jr. | 211/144 X |
| 4,549,714 | 10/1985 | Busch | 248/349 |

FOREIGN PATENT DOCUMENTS

| 1274101 | 9/1961 | France | 108/139 |
|---|---|---|---|
| 2301201 | 10/1976 | France | 312/305 |

Primary Examiner—J. Franklin Foss
Assistant Examiner—David L. Talbott
Attorney, Agent, or Firm—Kinney & Lange

[57] ABSTRACT

A multi-purpose furniture swivel assembly includes a ball bearing race base providing a pair of back-to-back bearing races, one being deeper than the other and includes a ball bearing assembly. In a first configuration, the bearing race base is pivotably mounted to a platform which is to be swiveled with the ball bearing assembly between them in the shallower bearing race, and this assembly is pivotably mounted with respect to a tabletop. In a second configuration, the bearing race base is inverted to support the bearing assembly in the deeper bearing race. The bearing race base is pivotably fastened to the platform, and support pads are carried on the now bottom side of the race base to support the race base in spaced relation with respect to a tabletop. In a third configuration, the support platform is constituted as the bottom wall of a television set cabinet, the bearing race base and the bearing assembly are configured as in the second form, and the support pads support the swivel assembly and television set wherever placed.

5 Claims, 10 Drawing Figures

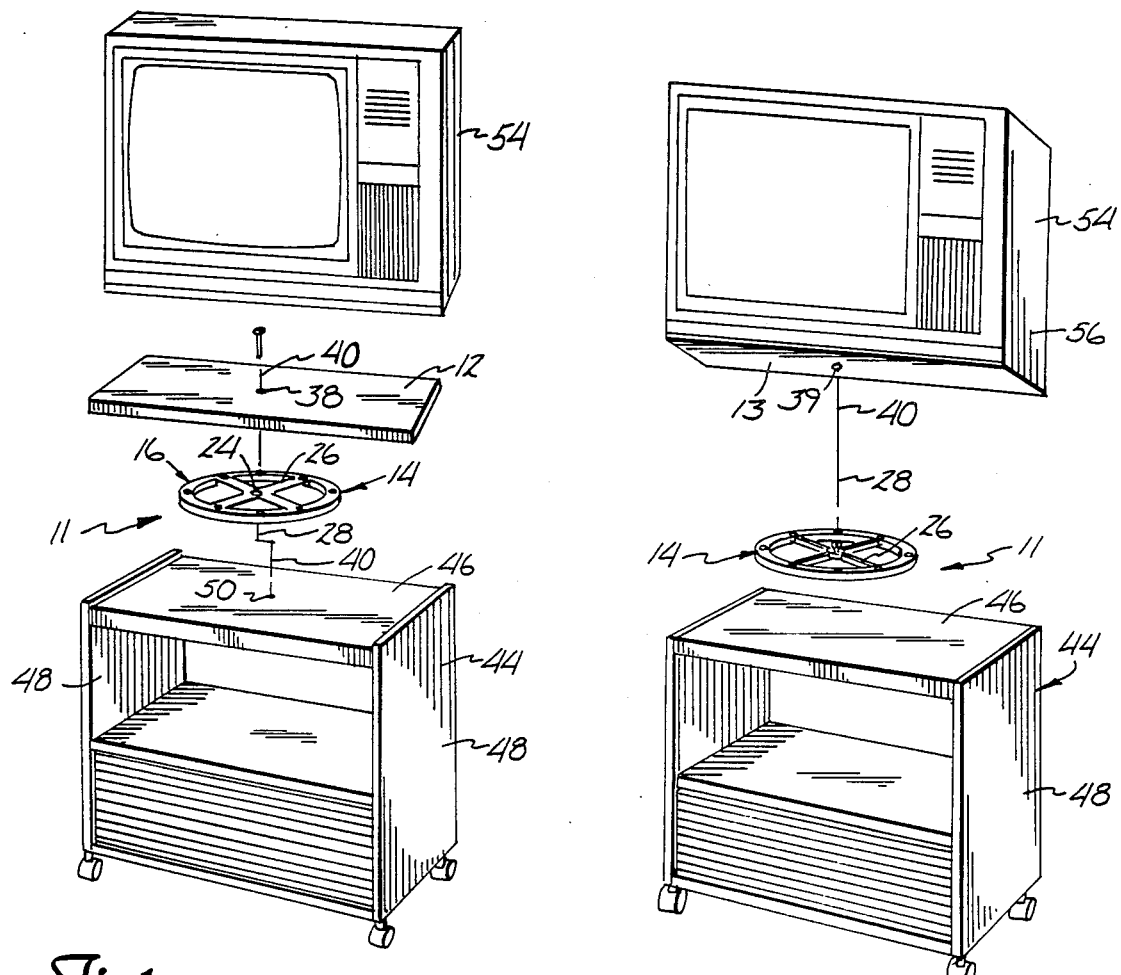
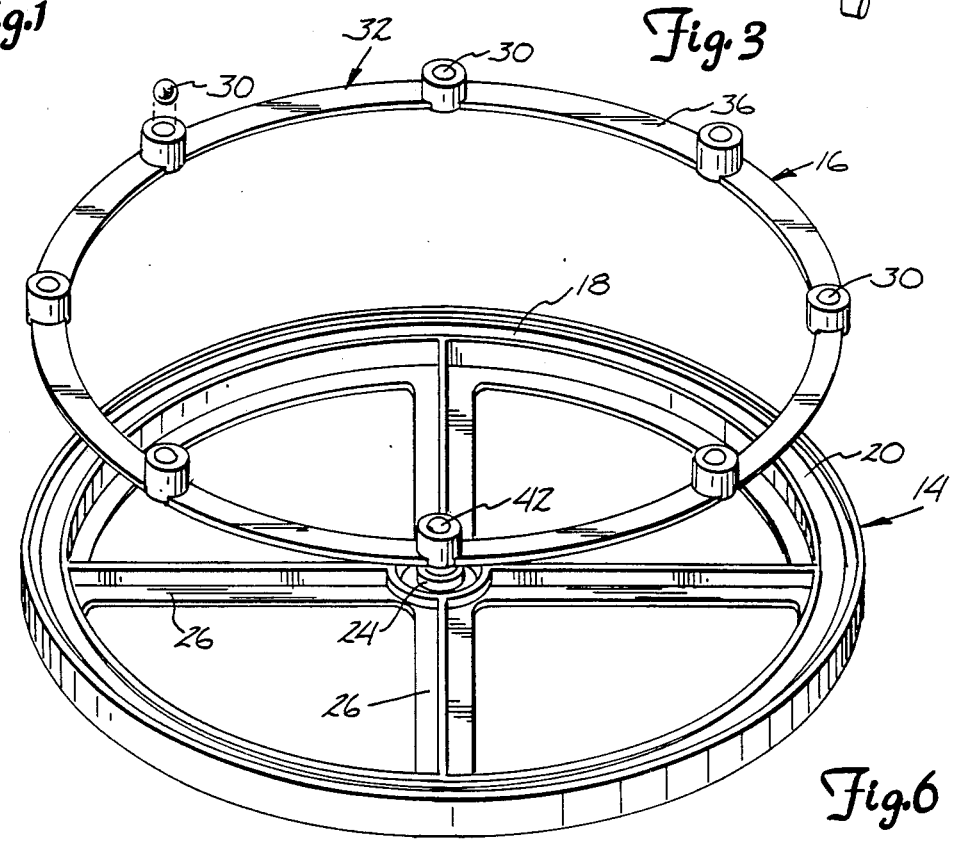

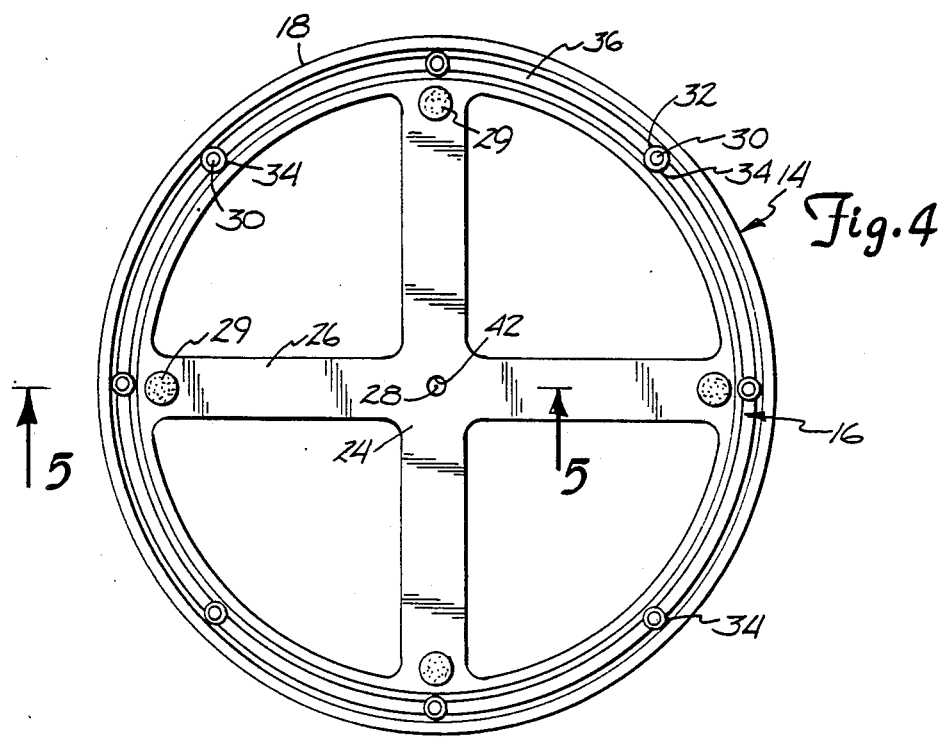
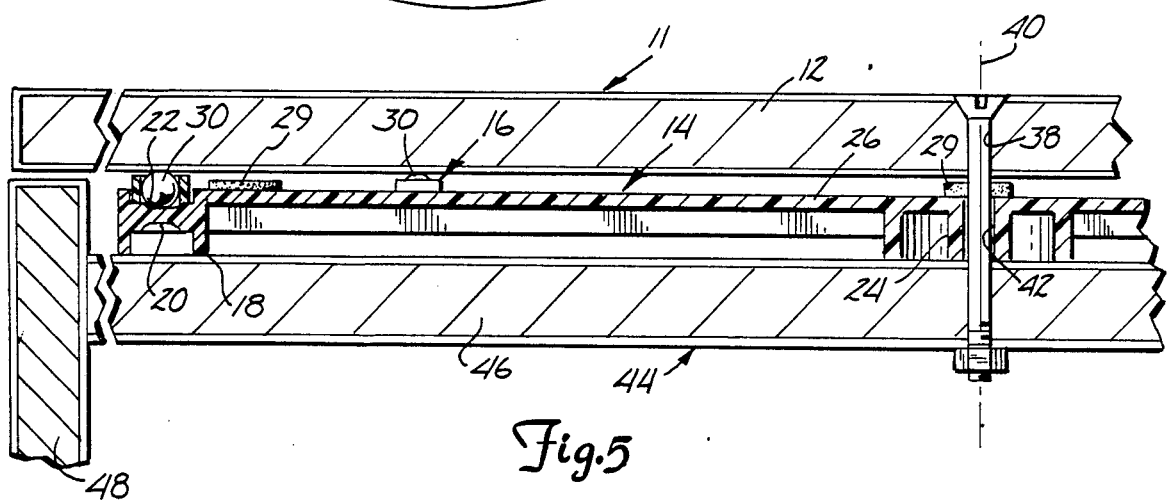
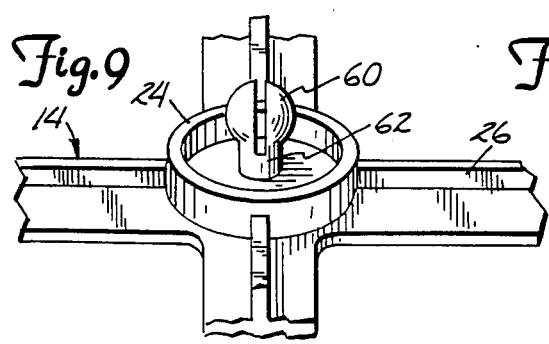
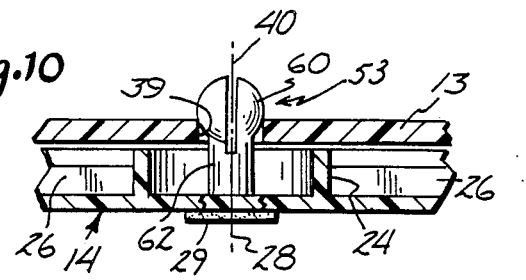

MULTI-PURPOSE FURNITURE SWIVEL ASSEMBLY

BACKGROUND OF THE INVENTION

1. Field of the Invention

This invention has relation to swivel assemblies which can be situated between appliances such as television sets and the tops of tables and which will then permit the appliance to be swiveled about a vertical axis.

2. Description of the Prior Art

It is known in the furniture art to place a bearing race and spider on a horizontal tabletop, to place ball bearings in the race, to put a platform to be swiveled on top of the bearings and race, and to extend a bolt through the platform, the center of the race spider and the table top to provide a rotating platform for a television set or other furniture accessory. This structure is very effective but its usefulness is limited to the place where the table or other furniture piece is located.

Also, where a rectangular platform of substantially the same size as a rectangular tabletop is involved, the end panels of the table, for example, cannot extend above the tabletop without interfering or at least dragging against the bottom of the platform when a heavy appliance is supported on the platform.

What is needed is a furniture swivel assembly which can be acquired by a consumer at the time of purchasing a furniture supported appliance such as a television set or computer component and which swivel assembly will be useful whether the consumer later decides to:

(1) mount the swivel assembly directly on the television set, for example, to allow for swiveling wherever the set is placed;

(2) mount the swivel to the bottom of a platform so that any appliance placed on the platform can swivel wherever the platform is placed; or (3) mount the swivel between the tabletop of a television stand, for example, and a platform but in such a manner as to allow the platform to clear the tops of the television stand end panels when they extend somewhat above the television stand tabletop.

A fourth desirable option is to provide a swivel mount connector which will allow the swivel assembly to be substantially instantaneously disassembled to separate the platform from the other elements of the assembly and to substantially instantaneously reassemble the swivel assembly.

SUMMARY OF THE INVENTION

A swivel assembly for supporting an appliance for swiveling movement with respect to a horizontal surface about a desired vertical appliance swivel axis can be assembled to operate in multiple configurations. Such an assembly includes a platform positioned in supported relationship under an appliance. In certain configurations, the platform is constituted as a separate entity, but in at least one configuration, the platform is constituted as the bottom wall of an appliance such as a television set, for example.

The swivel assembly also includes a bearing race base having a circular, annular bearing race track which provides a pair of back-to-back bearing races each open to one of the first and second sides of the race base, a central hub, and a spider fixedly positioning the race track in concentric relation to the hub about a vertical swivel assembly axis.

The swivel assembly includes a bearing assembly which has a plurality of bearings and a bearing retainer. The retainer includes a plurality of bearing cages each encompassing a central portion of one of the bearings while leaving the top and bottom portions of the bearings exposed. The retainer further includes a circular retaining ring integral with each of the cages and supporting the cages in evenly spaced relation to each other around the retainer ring. The ball bearing assembly is of a configuration such that the bearing retainer fits substantially within either of the back-to-back race tracks which is uppermost in a particular configuration with top portions of the bearings extending outwardly further than the race base.

Means is provided to fix the position of the circular bearing race track with respect to the platform such that the swivel assembly axis is in coicident relationship with respect to the appliance swivel axis.

A deeper first bearing race is open to a first side of the race base and a shallower second bearing race is open to a second side of the race base. The bearing race base carries support pads means extending outwardly from its second side far enough to support the race base in spaced relation to a horizontal surface when the second side is down but not extending far enough outwardly from its second side as do the tops of the bearings when the race base second side is up and the bearing assembly is positioned in the shallower second bearing race.

A fastening means for fastening the bearing race base in swiveling relationship to the platform with the bearing assembly therebetween is disclosed herein variously as including the use of a swivel alignment bolt or screw and as including the use of a slotted pop bead and a pop bead retaining opening. While the disclosure shows the pop bead extending upwardly from the hub of the bearing race into the platform, it is to be understood that such a pop bead arrangement could be used with the pop bead extending downwardly from the platform to and through a pop bead retaining opening in the hub. In fact, two pop bead assemblies back-to-back could be used in two such pop bead retaining openings within the spirit of the invention and the scope of the claims which follow.

BRIEF DESCRIPTION OF THE DRAWINGS

FIG. 1 is an exploded perspective view of a multi-purpose furniture swivel assembly of the invention assembled in a first configuration with a television stand and a television set;

FIG. 3 is an exploded perspective view showing the furniture swivel assembly of the invention assembled in a third configuration as an integral but removable part of a television set;

FIG. 4 is a top plan view of a bearing race base and a ball bearing assembly of the swivel assembly in its first configuration as illustrated in FIG. 1;

FIG. 5 is an enlarged fragmentary sectional view taken on the line 5—5 in FIG. 4;

FIG. 6 is an exploded view of the bearing race base and the ball bearing assembly preparatory to being assembled in its second configuration as illustrated in FIG. 2;

FIG. 9 is an enlarged fragmentary perspective view of a hub and a portion of a spider forming part of the bearing race base of the invention shown as a third configuration, a temporary means for fastening the bearing race base to a platform to be swiveled where that platform is constituted as the bottom wall of a television set cabinet as illustrated in FIG. 3; and FIG. 10 is a transverse vertical sectional view of a portion of the bearing race base of FIG. 9 showing it installed through the platform wall of a television set cabinet in accordance with the third configuration of the invention.

DETAILED DESCRIPTION OF THE PREFERRED EMBODIMENTS

Figure 2:
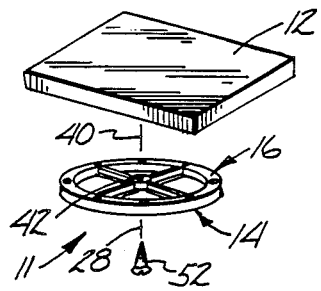
FIG. 2 is an exploded perspective view of the furniture swivel assembly of the invention assembled in a second configuration for use on any tabletop.
Figure 7:
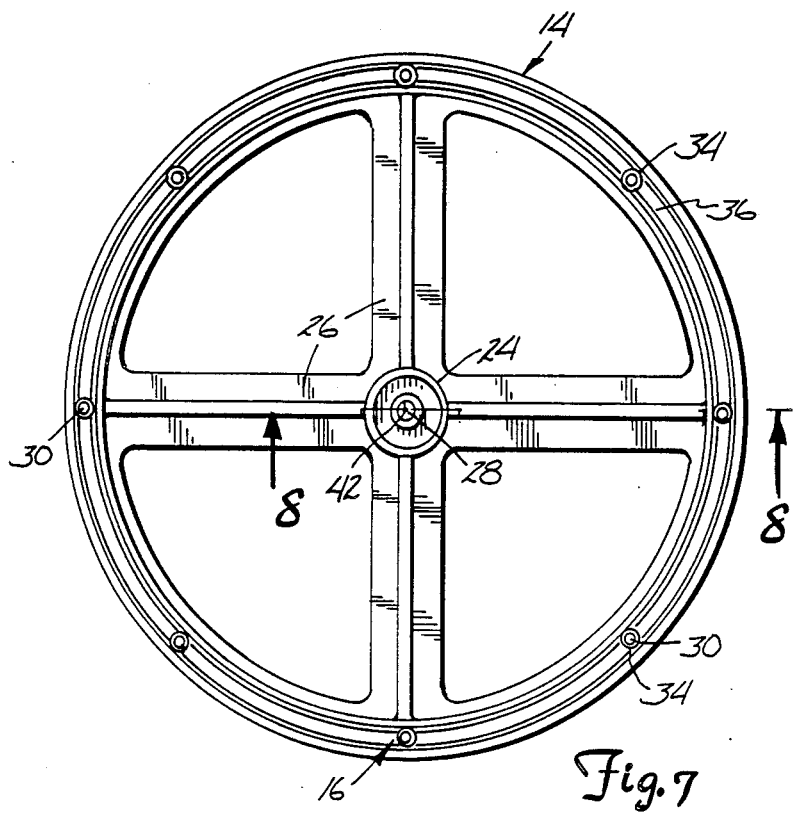
FIG. 7 is a top plan view of the ball bearing assembly and bearing race base of FIGS. 2 and 6.

A multi-purpose furniture swivel assembly 11 of the present invention as seen in a first configuration in FIGS. 1, 4 and 5 includes a platform 12, a bearing race base 14 and a ball bearing assembly 16. These are the same elements seen in the second configuration of FIGS. 2, 6, 7 and 8 although the bearing race base 14 is inverted in the second configuration with respect to the first. The platform, bearing race base and ball bearing assembly of the third configuration of the invention as seen in FIGS. 3, 9 and 10 are also substantially the same as seen in the second configuration except that the platform 12 is now indicated as platform 13 and is formed as the bottom wall of a cabinet 56 of a television set 54.

With the foregoing in mind, consideration of FIGS. 4 through 8 will be useful in understanding the construction of the ball bearing race base 14 and the ball bearing assembly 16. FIGS. 9 and 10 illustrate a modification of a hub of the bearing race base 14.

Bearing race base 14 includes a circular, annular bearing race track 18 which provides a pair of back-to-back bearing races, namely a deeper first bearing race 20 open to a first side of the bearing race base 14 and a shallower second bearing race 22 open to a second side of the race base 14. The race base also includes a central hub 24, and a plurality of spokes forming a spider 26 fixedly positioning the race track in concentric relation to the hub about a swivel assembly axis 28. A plurality of support pads 29 (four as shown) are affixed to the spider 26 on the second side of the race base 14 and extend outwardly from that base sufficiently to support it above a table top when its second side is down.

Ball bearing assembly 16 includes a plurality of ball bearings 30 and a bearing retainer 32. Retainer 32 includes a plurality of ball bearing cages 34, an annular retaining ring 36 integral with a bottom portion of each of the cages 34 and supporting those cages in evenly spaced relation to each other around the retainer ring.

The first bearing race 20 open to the first side of the bearing race base 14 is deeper than the second bearing race 22 open to the second side of the race base. The configuration of the ball bearing assembly 16 is such that the bearing retainer 32 fits substantially within the first bearing race 20 with top portions of the ball bearings extending outwardly of the bearing race track; and is such that the retainer ring 36 fits entirely within the second bearing race 22 with top portions of the bearings 30 extending outwardly of the second side of the bearing race base 14 farther than the support pads 29. In the first configuration of the furniture swivel assembly of the invention as seen in FIGS. 1, 4 and 5, the second side of the bearing race base is uppermost, and the ball bearing assembly 16 is situated in the second bearing race 22. Platform 12 is provided with vertical opening 38 in alignment with a vertical appliance swivel axis 40 about which it is desired the appliance will swivel. A vertical opening 42 is provided through the hub 24 in concentric relationship to the swivel assembly axis 28.

A television stand or table 44 includes a tabletop 46 and a pair of vertically upstanding end panels 48,48 supporting the tabletop. As seen in FIGS. 1 and 5, end panels 48,48 extend somewhat above the top of tabletop 46 necessitating a certain minimum amount of clearance between the bottom of platform 12 and the top of tabletop 46 in order that the platform can swivel freely in any direction without coming into interfering relationship with the top portions of end panels 48,48. As will be seen, such clearance is not necessary and is not provided for in connection with the use of the second and third configurations of the invention which are designed for use on an entirely flat tabletop or other horizontal supporting surface.

To assemble the multi-purpose furniture swivel assembly 11 in its first configuration, a vertical opening 50 is provided in the tabletop 46 in alignment with the vertical appliance swivel axis 40. Bearing race base 14 is placed on top of the tabletop 46, and platform 12 is placed on top of that. The openings, 50, 42 and 38 in those elements are vertically aligned, and swivel assembly fastening means in the form of a swivel alignment bolt or screw 52 is inserted through those openings and fastened in such a way that it will maintain the now coincident alignment of the desired vertical appliance swivel axis 40 and the swivel assembly axis 28 until that fastening means 52 is removed. Now an appliance such as television set 54 can be placed on the platform 12 and can be swiveled as the platform swivels with respect to the television stand or table 44.

To assemble the furniture swivel assembly of the invention in its second configuration as seen in FIGS. 2, 6, 7 and 8, the same bearing race base 14 will be used, but the annular bearing race track 18 will be inverted with respect to its position in connection with the first configuration. The ball bearing assembly 16 will not be inverted and will fit into the deeper first bearing race 20 with the ball bearings 30 extending outwardly from the bearing race base 14. The assemble the swivel assembly 11 in its second configuration, a vertical opening 38 will be provided into the bottom of or through the platform 12 in concentric relation to the desired appliance swivel axis about which the platform 12 is to swivel with an appliance thereon. A swivel assembly fastening means such as a swivel alignment bolt or screw 52 will be inserted through the vertical opening 42 in the central hub 24 of the bearing race base 14, aligned with the opening 38 into or through the platform 12, and tightened up sufficiently to fixedly position the bearing race base 14 with respect to the platform 12 to maintain the swivel assembly axis 28 and the appliance swivel axis 40 in coincident relationship with respect to each other, while not being so tight as to prevent easy rotation of the platform 12 with respect to the bearing race base 14 on the balls 30 of the ball bearing assembly 16.

Figure 8:
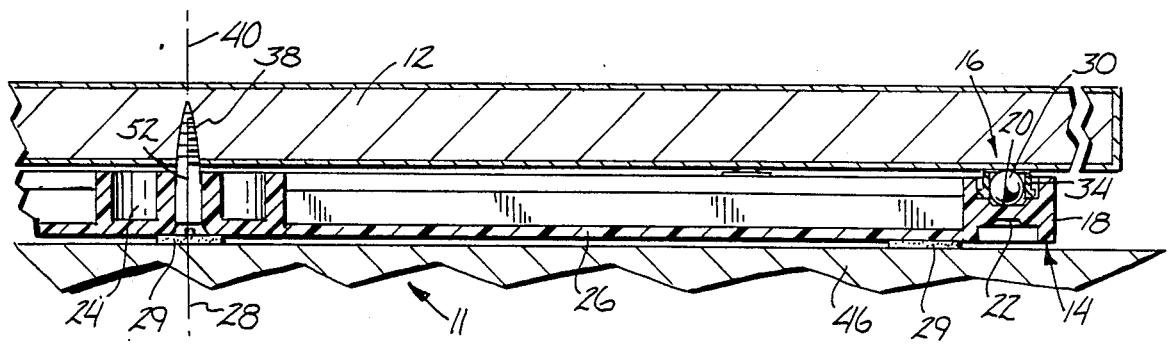
FIG. 8 is an enlarged fragmentary vertical sectional view taken on the line 8—8 in FIG. 7.

As seen in FIG. 8, this allows the support pads 29 to support the entire assembly on the top of a table 46 or on any other flat surface. Constituting the pads 29 of a material of relatively high frictional coefficient with respect to tabletops generally, it can be assured that the platform 12 and any appliance such, for example. as a television set (not shown) can be swiveled about axes 28 and 40 without any appreciable danger of lateral movement of the furniture swivel assembly 11 with respect to the tabletop. This is essential particularly in environments where vibrations or random jarring movements can take place (in a home including youngsters and pets, for example). This elimination of "creep" virtually eliminates the possibility that over the days, weeks and months, the swivel assembly will move towards the edge of its support table, unbalancing the table or the appliance on the platform to the point where an upset can occur.

In the third configuration of the swivel assembly, as seen in FIGS. 3, 9 and 10, the relationship of the bearing race base 14 and the ball bearing assembly 16 with respect to each other is virtually the same as in the second configuration. The difference is that the platform 12 has been replaced with a platform 13 which forms an integral part of cabinet 56 of television set 54. A swivel assembly fastening means such as swivel alignment bolt or screw 52 could be used up through the bottom of the bearing race base 14 into a vertical opening such as opening 38 into the platform 13; but a different fastening means is shown.

Instead of vertical opening 38 designed to hold a bolt or a screw, a somewhat larger opening 39 is provided through the platform 13 in concentric alignment with the desired vertical appliance swivel axis 40; and a slotted pop bead 60 extends upwardly from the central hub 24 of the bearing race base 14 on a shank 62 of lesser diameter to be in concentric relationship with respect to the swivel assembly axis 28. In FIGS. 9 and 10, shank 62 and pop bead 60 are shown to be integral parts of the hub 24 and integral extensions of the spider 26; but it is to be understood that this modified fastening means could include a cap screw, for example, extending through an opening such as the vertical opening 42 up into a shank and pop bead to fixedly but removably hold the pop bead in a position such as that seen in FIG. 10.

As suggested in FIG. 3, the extremely lightweight bearing race base/bearing assembly structure can be fixedly but removably positioned with respect to the bottom side of the platform 13 simply by pressing the pop bead up through the opening 39 to position as seen in FIG. 10 where it will not come loose until and unless the bearing race base 14 is pried off of the platform 13 by causing the pop bead to pass outwardly through the opening 39 in the platform.

With the parts so assembled, when the television set 54 and the furniture swivel assembly 11 are put down approximately in the center of a flush mounted tabletop 46 of the television stand or table 44, the support pads 29 will hold the bearing race base 14 slightly off of the top of that table, and any "creeping" which might occur as the television stand 44 itself is moved about the room will be eliminated.

Although the present invention has been described with reference to preferred embodiments, workers skilled in the art will recognize that changes may be made in form and detail without departing from the spirit and scope of the invention.

What is claimed is:

1. A multi-purpose swivel assembly for supporting an appliance for swiveling movement with respect to a horizontal tabletop about a vertical appliance swivel axis, the swivel assembly including:
   a. a platform positioned in supportive relationship under an appliance;
   b. a bearing race base having a circular, annular bearing race track providing a pair of back-to-back bearing races each open to one of first and second sides of the race base, a central hub, and a spider fixedly positioning the race track in concentric relation to the hub about a vertical swivel assembly axis;
   c. a bearing assembly including a plurality of bearings and a bearing retainer, the retainer including a plurality of bearing cages each encompassing a central portion of one of the bearings while leaving the top and bottom portions of the bearings exposed, the retainer further including a circular retaining ring integral with each of the cages and supporting the cages in evenly spaced relation to each other around the retainer ring;
   d. the bearing assembly being of configuration such that the bearing retainer fits substantially within either of the back-to-back race tracks which is uppermost in a particular configuration with top portions of the bearings extending outwardly farther than the race base;
   e. means including the hub to fix the position of the bearing race track with respect to the platform such that the swivel assembly axis is in coincident relationship with respect to the appliance swivel axis;
   f. wherein a deeper first bearing race is open to a first side of the race base and a shallower second bearing race is open to a second side of the race base; and
   g. wherein the bearing race base carries support pad means extending outwardly from its second side far enough to support the race base in spaced relation to a horizontal surface when the second side is down but not as far as the tops of the bearings when the race base second side is up and the bearing assembly is positioned in the shallower second bearing race.

2. The swivel assembly of claim 1 wherein:
   h. the hub is provided with a vertical opening therethrough in alignment with the swivel assembly axis;
   i. the platform is provided with a vertical opening therein in alignment with the appliance swivel axis; and
   j. the means to fix the position of the race track includes fastening means extending through the opening in the hub and into the opening in the platform.

3. The swivel assembly of claim 2 wherein:
   k. the platform is constituted as a bottom wall of the appliance supported for swiveling movement.

4. A multi-purpose swivel assembly for supporting an appliance for swiveling movement with respect to a horizontal tabletop about a vertical appliance swivel axis, the swivel assembly including:
   a. a platform positioned in supportive relationship under an appliance;
   b. a bearing race base having a circular, annular bearing race track providing a pair of back-to-back bearing races each open to one of first and second sides of the race base, a central hub, and a spider fixedly positioning the race track in concentric relation to the hub about a vertical swivel assembly axis;

c. a bearing assembly including a plurality of bearings and a bearing retainer, the retainer including a plurality of bearing cages each encompassing a central portion of one of the bearings while leaving the top and bottom portions of the bearings exposed, the retainer further including a circular retaining ring integral with each of the cages and supporting the cages in evenly spaced relation to each other around the retainer ring;

d. the bearing assembly being of configuration such that the bearing retainer fits substantially within either of the back-to-back race tracks which is uppermost in a particular configuration with top portions of the bearings extending outwardly farther than the race base;

e. means including the hub to fix the position of the bearing race track with respect to the platform such that the swivel assembly axis is in coincident relationship with respect to the appliance swivel axis;

f. wherein the hub is provided with a fastening means extending upwardly from a first side of the race base;

g. wherein the platform is provided with a fastening means receptacle in alignment with the appliance swivel axis;

h. wherein the means to fix the race track includes the the fastening means, the fastening means receptacle, and means for retaining the fastening means in the receptacle;

i. wherein the fastening means is constituted as a resilient pop bead extending outwardly in fixed relation to said race base; and j. wherein the fastening means receptacle includes an opening of size to receive the pop bead under pressure and to retain it against the weight of the bearing race base and bearing assembly until it is removed under a comparable pressure.

5. A multi-purpose swivel assembly for supporting an appliance for swiveling movement with respect to a horizontal tabletop about a vertical appliance swivel axis, the swivel assembly including:

a. a platform positioned in supportive relationship under an appliance;

b. a bearing race base having a circular, annular bearing race track providing a pair of back-to-back bearing races each open to one of first and second sides of the race base, a central hub, and a spider fixedly positioning the race track in concentric relation to the hub about a vertical swivel assembly axis;

c. a bearing assembly including a plurality of bearings and a bearing retainer, the retainer including a plurality of bearing cages each encompassing a central portion of one of the bearings while leaving the top and bottom portions of the bearings exposed, the retainer further including a circular retaining ring integral with each of the cages and supporting the cages in evenly spaced relation to each other around the retainer ring;

d. the bearing assembly being of configuration such that the bearing retainer fits substantially within either of the back-to-back race tracks which is uppermost in a particular configuration with top portions of the bearings extending outwardly farther than the race base;

e. means including the hub to fix the position of the bearing race track with respect to the platform such that the swivel assembly axis is in coincident relationship with respect to the appliance swivel axis;

f. wherein a deeper first bearing race is open to a first side of the race base and a shallower second bearing race is open to a second side of the race base;

g. wherein the bearing race base carries support pad means extending outwardly from its second side far enough to support the race base in spaced relation to a horizontal surface when the second side is down but not as far as the tops of the bearings when the race base second side is up and the bearing assembly is positioned in the shallower second bearing race;

h. wherein the hub is provided with a fastening means extending upwardly from a first side of the race base;

i. wherein the platform is provided with a fastening means receptacle in alignment with the appliance swivel axis;

j. wherein the means to fix the race track includes the fastening means, the fastening means receptacle and means for retaining the fastening means in the receptacle;

k. wherein the fastening means is constituted as a resilient pop bead extending outwardly in fixed relation to said race base; and l. wherein the fastening means receptacle includes an opening to size to receive the pop bead under pressure and to retain it against the weight of the bearing race base and bearing assembly until it is removed under a comparable pressure.

* * * * *